(12) United States Patent
Kikuchi et al.

(10) Patent No.: US 7,322,207 B2
(45) Date of Patent: Jan. 29, 2008

(54) AIR REFRIGERANT COOLING APPARATUS AND AIR REFRIGERATION SYSTEM USING THE AIR REFIGERANT COOLING APPARATUS

(75) Inventors: Shigemitsu Kikuchi, Kanagawa (JP); Hiroshi Igawa, Kanagawa (JP); Seiichi Okuda, Kanagawa (JP)

(73) Assignees: Mitsubishi Heavy Industries, Ltd., Tokyo (JP); International Center for Environmental Technology Transfer, Yokkaichi, Mie (JP)

( * ) Notice: Subject to any disclaimer, the term of this patent is extended or adjusted under 35 U.S.C. 154(b) by 407 days.

(21) Appl. No.: 10/524,877

(22) PCT Filed: Nov. 29, 2004

(86) PCT No.: PCT/JP2004/017712

§ 371 (c)(1),
(2), (4) Date: Jun. 6, 2005

(87) PCT Pub. No.: WO2006/011248

PCT Pub. Date: Feb. 2, 2006

(65) Prior Publication Data

US 2007/0101755 A1    May 10, 2007

(30) Foreign Application Priority Data

Jul. 30, 2004    (JP) .............................. 2004-224926

(51) Int. Cl.
*F25D 9/00*    (2006.01)
(52) U.S. Cl. .......................................... 62/401; 62/402

(58) Field of Classification Search .................... 62/86, 62/87, 172, 401, 402, 228.3; 415/68, 107
See application file for complete search history.

(56) References Cited

U.S. PATENT DOCUMENTS

| | | | | |
|---|---|---|---|---|
| 3,696,637 A | * | 10/1972 | Ness et al. | 62/402 |
| 4,328,684 A | * | 5/1982 | Leo | 62/402 |
| 5,248,239 A | * | 9/1993 | Andrews | 415/104 |
| 5,644,928 A | * | 7/1997 | Uda et al. | 62/402 |
| 5,884,498 A | * | 3/1999 | Kishimoto et al. | 62/228.1 |
| 5,924,307 A | * | 7/1999 | Nenov | 62/643 |

(Continued)

FOREIGN PATENT DOCUMENTS

JP    S56-18883    2/1981

(Continued)

*Primary Examiner*—Mohammad M. Ali
(74) *Attorney, Agent, or Firm*—Ben Hauptman; Manabu Kanesaka; Ken Berner

(57) ABSTRACT

An air refrigerant cooling apparatus has magnetic bearings with high reliability and high efficiency. The air refrigerant cooling apparatus includes a motor having a first magnetic bearing and a second magnetic bearing for supporting a shaft, a compressor and an expansion turbine. The compressor is connected to the shaft and separated from the first magnetic bearing by a first labyrinth. The expansion turbine is connected to the shaft and separated from the second magnetic bearing by a second labyrinth. Pressure differences are generated between spaces where the first magnetic bearing and the second magnetic bearing are provided and respective inlet of the compressor and outlet of the expansion turbine by an external pressure outside the motor.

21 Claims, 10 Drawing Sheets

U.S. PATENT DOCUMENTS

| | | | | |
|---|---|---|---|---|
| 6,148,622 A | * | 11/2000 | Sanger | 62/88 |
| 6,151,909 A | * | 11/2000 | Carter et al. | 62/402 |
| 6,164,084 A | * | 12/2000 | Watson et al. | 62/402 |
| 6,415,621 B2 | * | 7/2002 | Buchholz et al. | 62/402 |
| 6,848,261 B2 | * | 2/2005 | Claeys | 62/87 |

FOREIGN PATENT DOCUMENTS

| | | |
|---|---|---|
| JP | H05-106944 | 4/1993 |
| JP | H06-034212 | 2/1994 |
| JP | H06-32123 | 4/1994 |
| JP | H07-091760 | 4/1995 |
| JP | 08-61366 | 3/1996 |
| JP | 8-61366 A * | 3/1996 |
| JP | H08-061821 | 3/1996 |
| JP | 9178323 | 7/1997 |
| JP | 10267444 | 10/1998 |
| JP | H11-055899 | 2/1999 |
| JP | 11-132582 | 5/1999 |
| JP | H11-132583 | 5/1999 |
| JP | 2000-356425 | 12/2000 |
| JP | 2001-123997 | 5/2001 |
| JP | 2002-120000 | 4/2002 |
| JP | 2003-083634 | 3/2003 |
| JP | 2003-302116 | 10/2003 |
| WO | WO2005/011001 | 2/2005 |

* cited by examiner

AIR REFRIGERANT COOLING APPARATUS AND AIR REFRIGERATION SYSTEM USING THE AIR REFRIGERANT COOLING APPARATUS

The present application is based on, International Application No. PCT/JP2004/17712, filed on Nov. 29, 2004, and claims priority from, Japan Application Serial Number 2004-224926, filed Jul. 30, 2004, the disclosure of which is hereby incorporated by reference herein in its entirety.

TECHNICAL FIELD

The present invention relates to an air refrigerant cooling apparatus and an air refrigeration system using the air refrigerant cooling apparatus. In particular, the present invention relates to an air refrigerant cooling apparatus having a magnetic bearing structure, and an air refrigeration system using the air refrigerant cooling apparatus having the magnetic bearing structure.

BACKGROUND ART

According to a conventional air refrigeration system, an air refrigerant cooling apparatus which is a component of the air refrigeration system uses a motor in which a rotor shaft is rotated on bearings such as ball bearings, roller bearings and so on. In order to generate cooling air with a desired temperature, it is necessary to provide not only the air refrigerant cooling apparatus but also an air cooler and a booster for compressing air refrigerant supplied to the air refrigerant cooling apparatus beforehand. Also, with regard to the motor using the ball bearings the roller bearings and the like, maintenance for replacing such the bearings is necessary with a periodic interval. It is not possible during the maintenance to cool freights in a warehouse.

As a means for improving refrigeration performance of the air refrigerant cooling apparatus and simplifying a configuration of the air refrigeration system, high-speed rotation can be considered in which the rotational frequency of the motor in the air refrigerant cooling apparatus is increased.

A "magnetic bearing apparatus" is popularly known as a driving mechanism for attaining the high-speed rotation. FIG. 1 shows a schematic configuration of a "magnetic bearing apparatus" disclosed in Japanese Unexamined Patent Publication JP-P-Heisei 8-61366. The magnetic bearing apparatus shown in FIG. 1 has an axial magnetic bearing 5 for controlling axial displacement of a shaft 2 through a rotor disk 4 with a disk shape fixed to the shaft 2, and a pair of radial magnetic bearings 6 and 7 which located on both sides of the axial magnetic bearing 5 in the axial direction and controls radial displacement of the shaft 2. In addition, the magnetic bearing device has an annular member surrounding the circumference of the rotor disk 4, a vent 13a provided in the annular member for blowing an air to cool down the rotor disk, and a couple of gap providing members 20 and 21. The gap providing members 20 and 21 surround the circumference of the shaft 2 at the both sides of the rotor disk 4 in the axial direction, which forms substantially constant gaps between the shaft 2 and the gap providing members for passing the air from the vent 13a.

Also, in association with the technology mentioned above, another technology is proposed as shown below.

An "air refrigerant cooling apparatus" disclosed in Japanese Unexamined Patent Publication JP-P-Heisei 11-132582 is characterized by a compressor, an air cooler, an air-to-air heat exchanger, and an expander arranged along the passage of air for conveying the air from a cooling room to be chilled through the air-to-air heat exchanger to the compressor and feeding the cooling room to be chilled with the air released from the expander. The air refrigerant cooling apparatus includes a first valve-equipped bypass for allowing a portion or all of the air released from the expander to bypass the cooling room to be chilled and then return back to the air-to-air heat exchanger, and a valve-equipped hot-air bypass for introducing air at not lower than 0° C. from the path between the compressor and the expander and supplying the air to an inlet air path of the air-to-air heat exchanger.

DISCLOSURE OF INVENTION

It is an object of the present invention to provide an air refrigerant cooling apparatus having high reliability and high efficiency. More particularly, an object of the present invention is to provide an air refrigerant cooling apparatus equipped with a magnetic bearing which has high reliability and efficiency. It is another object of the present invention to provide an air refrigeration system whose configuration is simplified by the use of the air refrigerant cooling apparatus.

An air refrigerant cooling apparatus according to the present invention has a motor casing, a shaft installed in the motor casing, a motor stored in the motor casing and having a first magnetic bearing and a second magnetic bearing for supporting the shaft, a compressor, and an expansion turbine. The compressor is positioned in a first axial side of the motor and is connected to the shaft. The compressor is separated from the first magnetic bearing by a first labyrinth. The expansion turbine is positioned in a second axial side of the motor and is connected to the shaft. The expansion turbine is separated from the second magnetic bearing by a second labyrinth. A pressure difference is generated between a space where the first magnetic bearing and the second magnetic bearing are provided and respective of an inlet of the compressor and an outlet of the expansion turbine by an external pressure outside the motor.

Also, the air refrigerant cooling apparatus according to the present invention further has sensors for detecting a position of the shaft. The sensors are provided adjacent to the first magnetic bearing and the second magnetic bearing. A pressure difference is generated between a space where the sensors are provided and an outside of the motor casing by an external pressure outside the motor.

An air refrigerant cooling apparatus according to the present invention has a motor casing, a shaft installed in the motor casing, a motor stored in the motor casing and having a first magnetic-bearing and a second magnetic bearing for supporting the shaft, a compressor, an expansion turbine, and a means for generating a pressure difference between a space where the first magnetic bearing and the second magnetic bearing are provided and respective of an inlet of the compressor and an outlet of the expansion turbine. The compressor is positioned in a first axial side of the motor and is connected to the shaft. The compressor is separated from the first magnetic bearing by a first labyrinth. The expansion turbine is positioned in a second axial side of the motor and is connected to the shaft. The expansion turbine is separated from the second magnetic bearing by a second labyrinth.

Also, the air refrigerant cooling apparatus according to the present invention further has sensors for detecting a position of the shaft which are provided adjacent to the first magnetic bearing and the second magnetic bearing, and a means for generating a pressure difference between a space where the sensors are provided and an outside of the motor casing.

Also, an air refrigeration system according to the present invention includes the air refrigerant cooling apparatus, a first heat exchanger, a second heat exchanger, a refrigerator, a filter, and a fan. An outlet of the compressor in the air refrigerant cooling apparatus is connected to an inlet of the first heat exchanger. An outlet of the first heat exchanger is connected to an inlet of the second heat exchanger. An outlet of the second heat exchanger is connected to an inlet of the expansion turbine in the air refrigerant cooling apparatus. An outlet of the expansion turbine in the air refrigerant cooling apparatus is connected to an inlet of the refrigerator. An outlet of the refrigerator is connected to an inlet of the compressor in the air refrigerant cooling apparatus through the second heat exchanger. The fan is connected to an air vent provided on the motor casing through the filter to cool down an inside of the motor in the air refrigerant cooling apparatus.

Also, an air refrigeration system according to the present invention includes the air refrigerant cooling apparatus, a first heat exchanger, a second heat exchanger, a refrigerator, and a radiator. An outlet of the compressor in the air refrigerant cooling apparatus is connected to an inlet of the first heat exchanger. An outlet of the first heat exchanger is connected to an inlet of the second heat exchanger. An outlet of the second heat exchanger is connected to an inlet of the expansion turbine in the air refrigerant cooling apparatus. An outlet of the expansion turbine in the air refrigerant cooling apparatus is connected to an inlet of the refrigerator. An outlet of the refrigerator is connected to an inlet of the compressor in the air refrigerant cooling apparatus through the second heat exchanger. The radiator is provided outside the air refrigerant cooling apparatus to cool down an inside of the motor in the air refrigerant cooling apparatus. An inlet and an outlet of the radiator are connected to air vents which are provided on the motor casing and associated with respective of the inlet and the outlet of the radiator.

Also, an air refrigeration system according to the present invention includes the air refrigerant cooling apparatus, a first heat exchanger, a second heat exchanger, and a refrigerator. An outlet of the compressor in the air refrigerant cooling apparatus is connected to an inlet of the first heat exchanger. An outlet of the first heat exchanger is connected to an inlet of the second heat exchanger. An outlet of the second heat exchanger is connected to an inlet of the expansion turbine in the air refrigerant cooling apparatus. An outlet of the expansion turbine in the air refrigerant cooling apparatus is connected to an inlet of the refrigerator. An outlet of the refrigerator is connected to an inlet of the compressor in the air refrigerant cooling apparatus through the second heat exchanger. A conduit connected to the outlet of the second heat exchanger is branched for cooling down an inside of the motor in the air refrigerant cooling apparatus. The branched conduit is connected to an air vent provided on the motor casing in the air refrigerant cooling apparatus. The inlet of the compressor in the refrigerant cooling apparatus is connected to another air vent provided on the motor casing in the refrigerant cooling apparatus.

Also, a refrigerator container according to the present invention includes the air refrigerant cooling apparatus, a first heat exchanger, a second heat exchanger, a container box, and a radiator. An outlet of the compressor in the air refrigerant cooling apparatus is connected to an inlet of the first heat exchanger. An outlet of the first heat exchanger is connected to an inlet of the second heat exchanger. An outlet of the second heat exchanger is connected to an inlet of the expansion turbine in the air refrigerant cooling apparatus. An outlet of the expansion turbine in the air refrigerant cooling apparatus is connected to an inlet of the container box. An outlet of the container box is connected to an inlet of the compressor in the air refrigerant cooling apparatus through the second heat exchanger. The radiator is provided outside the air refrigerant cooling apparatus to cool down an inside of the motor in the air refrigerant cooling apparatus. An inlet and an outlet of the radiator are connected to air vents which are provided on the motor casing and associated with respective of the inlet and the outlet of the radiator. The air refrigerant cooling apparatus, the first heat exchanger, the second heat exchanger, the container box, and the radiator are configured to be transportable as the refrigerator container.

An air refrigeration system according to the present invention includes a first bearing for supporting a shaft, a compressing mechanism, an expansion turbine, a first heat exchanger, and a second heat exchanger. An outlet of the compressing mechanism in the air refrigerant cooling apparatus is connected to an inlet of the first heat exchanger. An outlet of the first heat exchanger is connected to an inlet of the second heat exchanger. An outlet of the second heat exchanger is connected to an inlet of the expansion turbine in the air refrigerant cooling apparatus. An outlet of the expansion turbine in the air refrigerant cooling apparatus is connected to an inlet of an refrigerator. An outlet of the refrigerator is connected to an inlet of the compressing mechanism through the second heat exchanger. A compressor in the compressing mechanism is connected to the shaft. The compressor is separated from the first bearing by a first labyrinth. The expansion turbine is connected to the shaft. The air refrigeration system further includes a first conduit for supplying an air refrigerant from between an outlet of the compressor and the inlet of the refrigerator to a space where the first bearing is provided.

The air refrigeration system according to the present invention further includes a second bearing supporting the shaft at a position closer to the expansion turbine than the compressor, and a second conduit for supplying the air refrigerant from the space where the first bearing is provided to a space where the second bearing is provided.

The air refrigeration system according to the present invention further includes a third conduit for supplying the air refrigerant from the space where the second bearing is provided to the outlet of the expansion turbine.

The air refrigeration system according to the present invention further includes a motor for rotating the shaft. The first bearing and the second bearing are magnetic bearings.

In the air refrigeration system according to the present invention, the first conduit is configured to derive the air refrigerant from the inlet of the expansion turbine.

In the air refrigeration system according to the present invention, the compressing mechanism further includes an auxiliary compressor provided upstream of the compressor.

A refrigerator container according to the present invention has the air refrigeration system of the present invention and a container box connected to the outlet of the expansion turbine.

According to the present invention, an air refrigerant cooling apparatus having high reliability and high efficiency can be attained.

Also, an air refrigeration system having high reliability and high efficiency with a simple configuration can be provided by incorporating the above-mentioned air refrigerant cooling apparatus having high reliability and high efficiency into a refrigeration system.

BEST MODE FOR CARRYING OUT THE INVENTION

An air refrigerant cooling apparatus and an air refrigeration system using the air refrigerant cooling apparatus according to the present invention will be described in the form of best modes with reference to the accompanying drawings.

Figure 1:
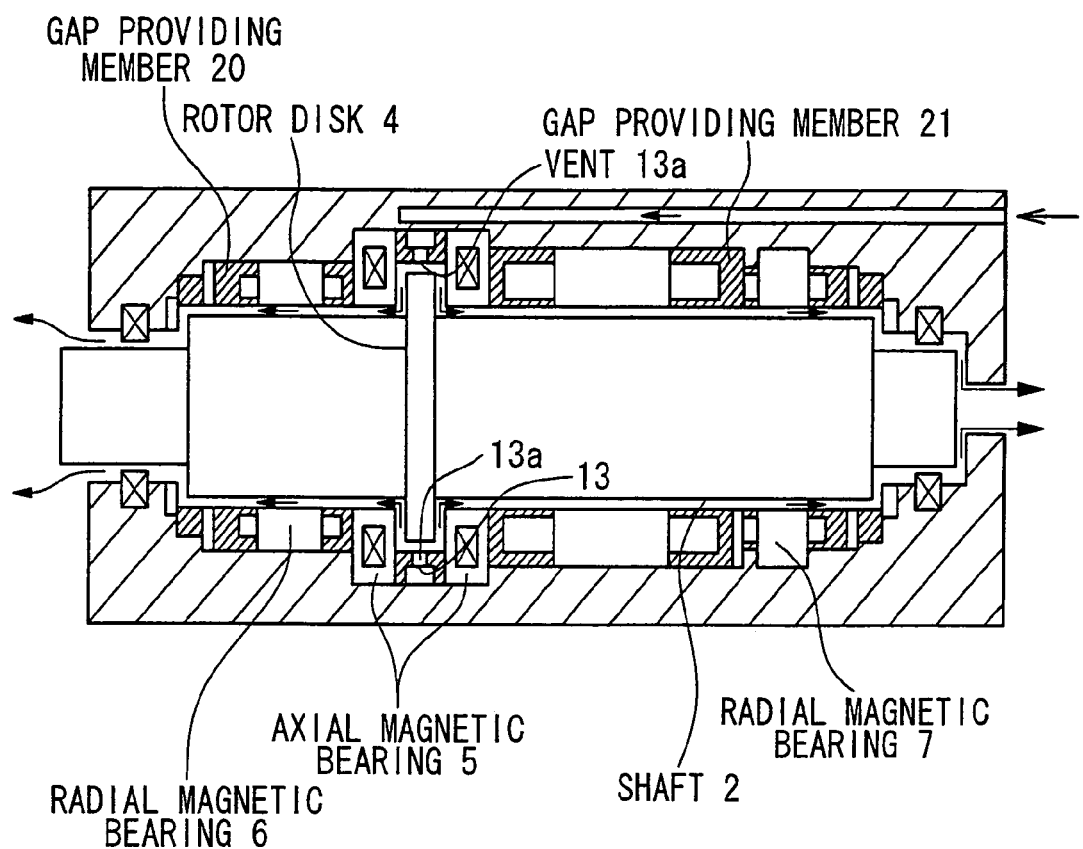
FIG. 1 is a cross sectional view schematically showing a conventional magnetic bearing apparatus.
Figure 2:
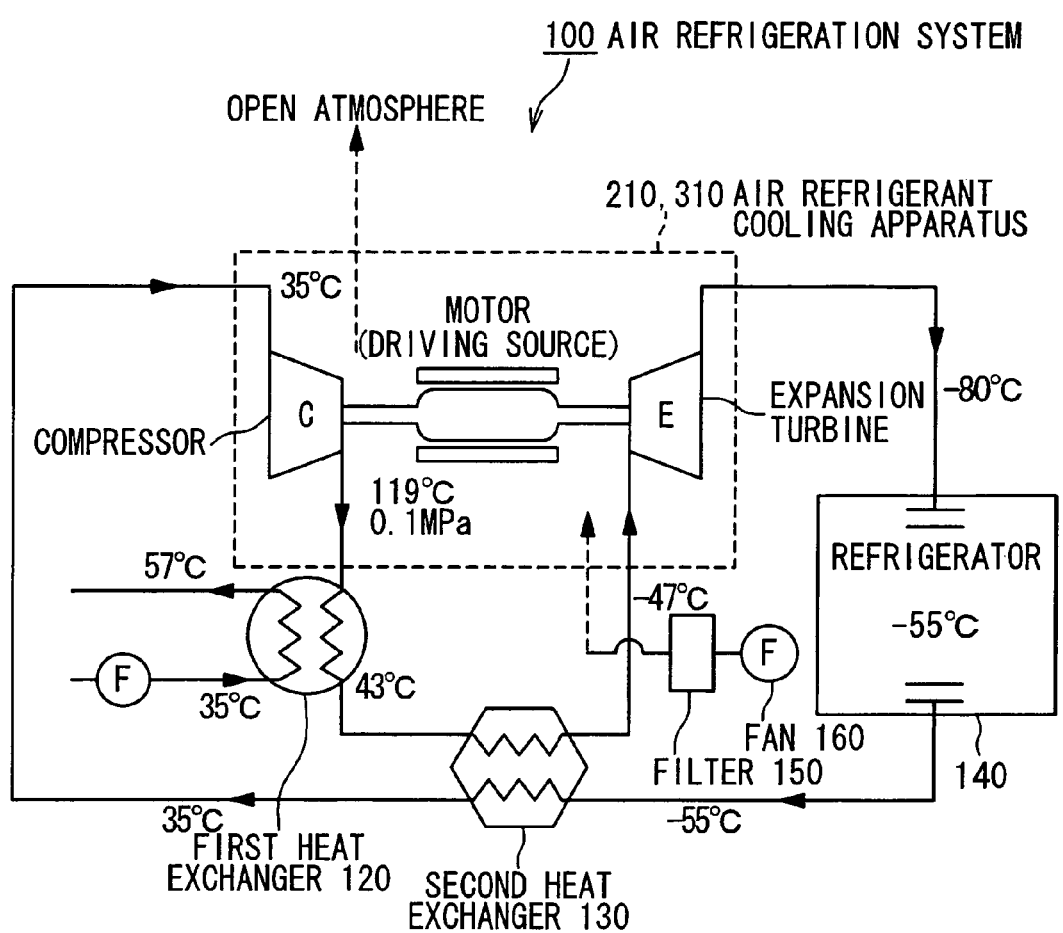
FIG. 2 illustrates an air refrigeration system according to a third embodiment of the present invention.

First, an air refrigerant cooling apparatus having a magnetic bearing structure and an air refrigeration system using the air refrigerant cooling apparatus will be explained for the purpose of overview of the general configuration of the present invention. FIG. 2 illustrates an air refrigeration system 100 according to a third embodiment of the present invention. The air refrigeration system 100 according to the present invention has an air refrigerant cooling apparatus 210 (310), a first heat exchanger 120, a second heat exchanger 130, and a refrigerator 140. The air refrigerant cooling apparatus 210 (310) includes a compressor, a motor and an expansion turbine.

In the air refrigeration system 100 according to the present invention, an air compressed by the compressor in the air refrigerant cooling apparatus 210 (310) is cooled down by the first heat exchanger 120. The cooled air is further heat-exchanged with an air from the refrigerator 140 in the second heat exchanger 130. Then, the air is adiabatically expanded in the expansion turbine of the air refrigerant cooling apparatus 210 (310) and thus is cooled down to lower temperature (to −80° C.) Then, the low temperature air is directly supplied into the refrigerator 140, and hence frozen products in the refrigerator 140 are kept at lower temperature. The principle of operation of the air refrigeration system 100 will be described later in more detail in conjunction with the third embodiment of the present invention.

First Embodiment

Figure 3:
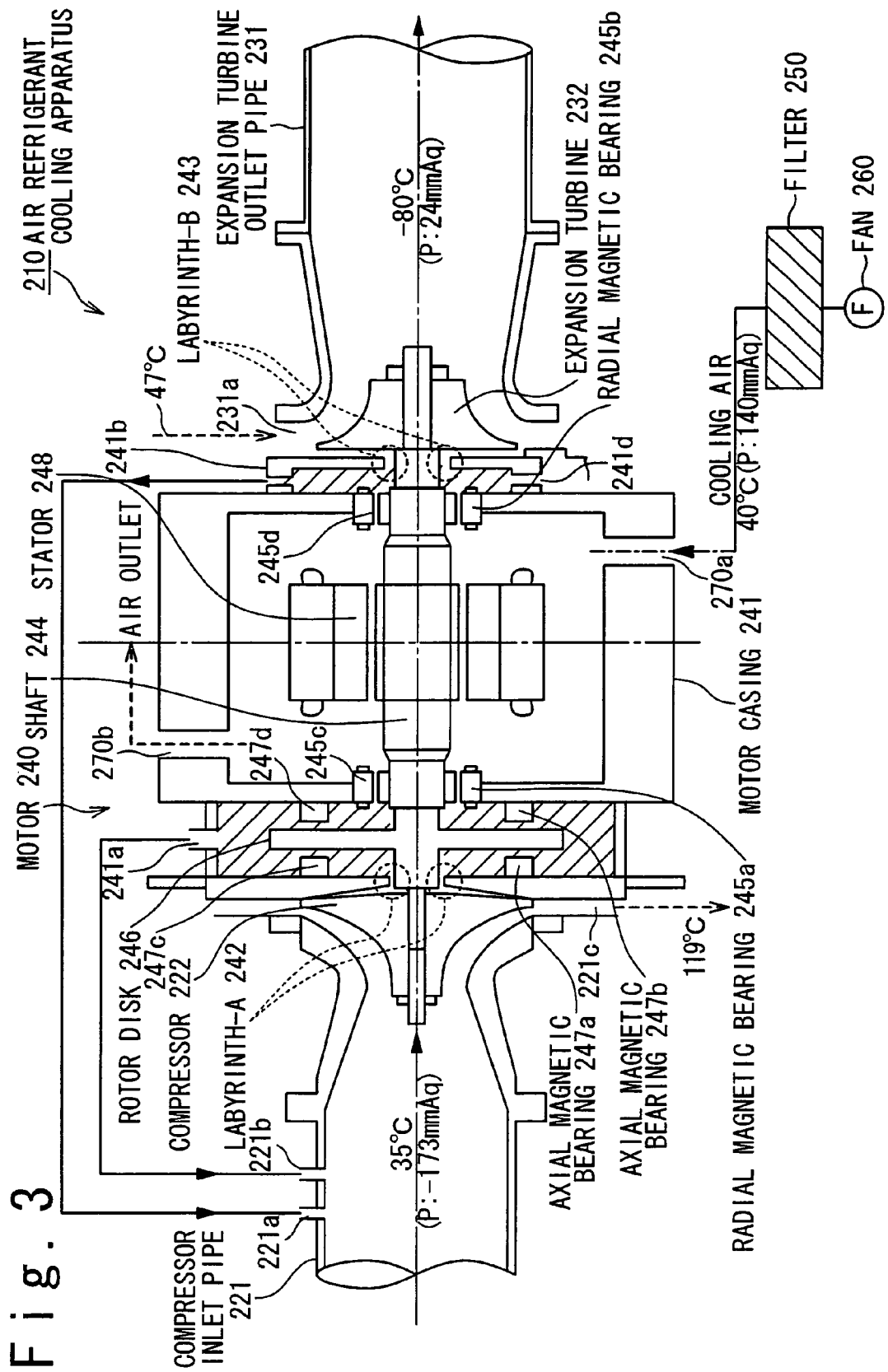
FIG. 3 is a cross sectional view schematically showing an air refrigerant cooling apparatus according to a first embodiment of the present invention.

FIG. 3 is a cross sectional view schematically showing the air refrigerant cooling apparatus 210 according to the first embodiment of the present invention. The air refrigerant cooling apparatus 210 according to the present embodiment includes a motor 240, a compressor 222, and an expansion turbine 232. The compressor 222 is connected to one axial end of the motor 240 and joined to a shaft 244 of the motor 240. The compressor 222 is connected at the inlet side to a compressor inlet pipe 221. The expansion turbine 232 is connected to the other axial end of the motor 240 opposite to the compressor 222 and joined to the shaft 244 of the motor 240. The expansion turbine 232 is connected at the outlet side to an expansion turbine outlet pipe 231. The motor 240 is located between the compressor 222 and the expansion turbine 232. The motor 240 has the shaft 244 installed as a rotating member in a motor casing 241, a stator 248 for driving the shaft 244, radial magnetic bearings 245a, 245b, 245c, and 245d supporting the shaft 244 in the radial direction, a rotor disk 246 vertically connected to the shaft 244, and axial magnetic bearings 247a, 247b, 247c, and 247d supporting the shaft 244 in the axial direction via the rotor disk 246.

Next, the principle of operation of the air refrigerant cooling apparatus 210 according to the present embodiment will be described.

The air refrigerant cooling apparatus 210 of the present embodiment is designed for achieving high operational efficiency by the high-speed rotation. The high reliability is required in an actual operation.

First, electromagnetic force is generated between the shaft 244 installed in the motor casing 241 of the motor 240 and a coil (not shown) provided around the stator 248, which is the rotational force for driving the shaft. The rotational driving force causes the shaft 244 of the motor 240 to rotate against the stator 248. In the actual operation, the shaft 244 is held in space with keeping a certain distance from the magnetic bearings in the radial direction and the axial direction due to the radial magnetic bearings 245a, 245b, 245c, and 245d and the axial magnetic bearings 247a, 247b, 247c, and 247d.

When the motor 240 is in action, the rotation of the shaft 244 causes heat within the motor 240. For the purpose of exhausting the heat occurred in the motor 240, the motor casing 241 is provided with a cooling air vent 270a and a cooling air vent 270b. When the motor 240 is in action, a cooling air (130 mmAq, 40° C.) is supplied from a fan 260 provided outside the air refrigerant cooling apparatus 210 into the motor 240 through a filter 250 and the cooling air vent 270a. After supplied into the motor 240 and cooling down the shaft 244 and the stator 248 which are the motor driver, the cooling air is exhausted to the outside of the air refrigerant cooling apparatus 210 through the cooling air vent 270b.

In the air refrigerant cooling apparatus 210, an air refrigerant (−173 mmAq, 35° C.) is supplied to the inlet in the axial direction of the compressor 222, and its temperature increases up to 119° C. due to the compression. Then, the air refrigerant is exhausted from a compressor vent 221c to the outside of the compressor 222. Also, the air refrigerant (−47° C.) is supplied to the expansion turbine 232 through a vent 231a. The air refrigerant is adiabatically expanded in the expansion turbine 232, and thus is cooled down to −80° C. Then, the adiabatically expanded air refrigerant at the temperature of −80° C. is exhausted from the turbine outlet in the axial direction to the outside of the expansion turbine 232.

The portions between the motor 240 and respective of the compressor 220 and the expansion turbine 232 are shielded by respective of a labyrinth-A 242 and a labyrinth-B 243 in order to prevent the compressed air refrigerant and the adiabatically expanded air refrigerant from flowing into the motor 240 when the air refrigerant is compressed in the compressor 222 and adiabatically expanded in the expansion turbine 232.

However, it may possibly happen that a portion of the air refrigerant leaks into the motor 240 through the labyrinth-A 242 or the labyrinth-B 243. In this case, contamination included in the air refrigerant flows into the motor 240. When the contamination moves into the motor 240, the contamination is attached to the shaft 244, the radial magnetic bearings 245a, 245b, 245c, and 245d, and the axial magnetic bearings 247a, 247b, 247c, and 247d, which causes a malfunction or fault of the motor 240.

According to the present embodiment, the motor casing 241 is provided with air vents 241a, 241b, and 241d. The air vents 241a, 241b, and 241d are located adjacent to the radial magnetic bearings 245a, 245b, 245c, and 245d and the axial magnetic bearings 247a, 247b, 247c, and 247d, respectively. The air vents 241a and 241b are connected via pipes to air holes 221b and 221a provided on the compressor inlet pipe 221, respectively. Thus, the contamination around the shaft 244, the radial magnetic bearings 245a, 245b, 245c, and 245d, and the axial magnetic bearings 247a, 247b, 247c, and 247d of the motor 240 is exhausted to the compressor 222 due to the difference between pressure in the motor 240 and pressure in the compressor 222. Since the pressure inside the motor 240 is lower than the pressure outside the motor 240 according to the present embodiment, the contamination around the radial magnetic bearings 245a, 245b, 245c, and 245d and the axial magnetic bearings 247a, 247b, 247c, and 247d can be quickly removed out from the motor.

According to the present embodiment, the radial magnetic bearings 245a, 245b, 245c, and 245d, and the axial magnetic bearings 247a, 247b, 247c, and 247d are applied to the motor 240 of the air refrigerant cooling apparatus 210 including the compressor 222, the motor 240 and the expansion turbine 232. In addition, the pressure difference is generated the inside of the motor and respective of the compressor 222 and the expansion turbine 232 in order to remove the contamination which moves into the motor 240 from the outside through the labyrinth-A 242 and the labyrinth-B 243.

Accordingly, lives of the shaft and the bearings becomes longer in spite of the high-speed rotation, and also replacement of the bearings becomes unnecessary. Thus, the operational reliability of the motor can be improved. Also, the contamination within the motor is removed, which further improves the operational reliability of the motor. As a result, it is possible to attain the air refrigerant cooling apparatus 210 having high operational reliability and high efficiency.

Since the air refrigerant cooling apparatus 210 is applicable to freezing, refrigerating, and air conditioning processes at different temperature level and pressures level, the refrigerant cooling apparatus according to the present invention includes a freezer, a refrigerator, and an air conditioner. Although the present embodiment is described in the application of the refrigeration, it is applicable to the cooling and the air conditioning in a similar way by adjusting the temperature and pressure levels.

Second Embodiment

Figure 4:
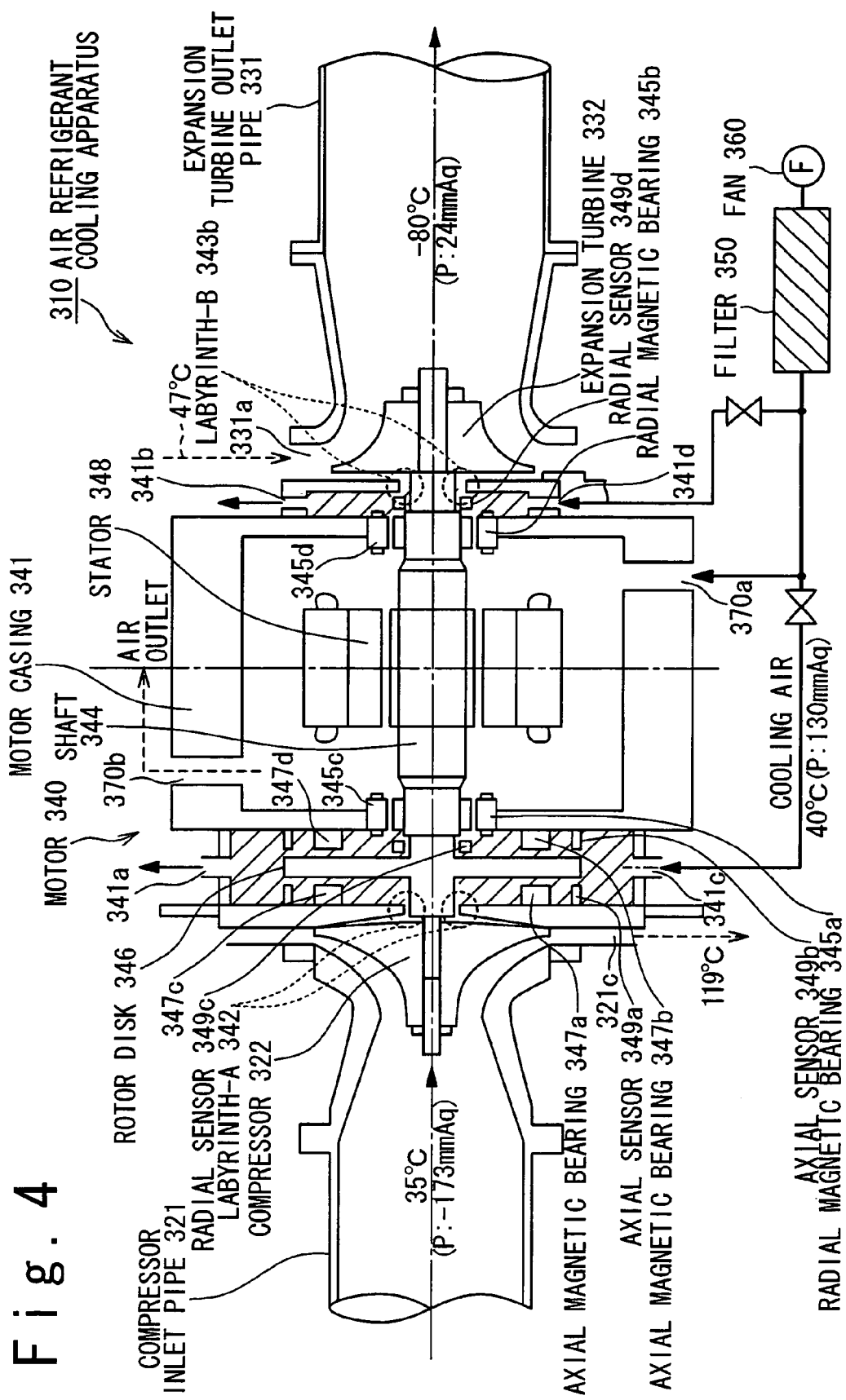
FIG. 4 is a cross sectional view schematically showing an air refrigerant cooling apparatus according to a second embodiment of the present invention.

FIG. 4 is a cross sectional view schematically showing an air-refrigerant cooling apparatus 310 according to the second embodiment of the present invention. The air refrigerant cooling apparatus 310 according to the present embodiment is substantially identical in the configuration to the air refrigerant cooling apparatus 210 in the first embodiment. The air refrigerant cooling apparatus 310 further has radial sensors 349c and 349d and axial sensors 349a and 349b provided adjacent to the radial magnetic bearings 345a, 345b, 345c, and 345d, and the axial magnetic bearings 347a, 347b, 347c, and 347d. The radial sensors and the axial sensors detect distances between a shaft 344 and respective magnetic bearings during the actual operation.

The air refrigerant cooling apparatus 310 according to the present embodiment includes a motor 340, a compressor 322, and an expansion turbine 332. The compressor 322 is connected to one axial end of the motor 340 and joined to the shaft 344 of the motor 340. The compressor 322 is connected at the inlet side to a compressor inlet pipe 321. The expansion turbine 332 is connected to the other axial end of the motor 340 opposite to the compressor 320 and joined to the shaft 344 of the motor 340. The expansion turbine 332 is provided with an air vent 331a for receiving the refrigerant air at the inlet side. The expansion turbine 332 is connected at the outlet side to an expansion turbine outlet pipe 331.

The motor 340 is located between the compressor 322 and the expansion turbine 332. The motor 340 has the shaft 344 accommodated as a rotating member in a motor casing 341, a stator 348 for driving the shaft 344, radial magnetic bearings 345a, 345b, 345c, and 345d supporting the shaft 344 in the radial direction, a rotor disk 346 vertically connected to the shaft 344, and axial magnetic bearings 347a, 347b, 347c, and 347d supporting the shaft 344 in the axial direction via the rotor disk 346.

Next, the principle of operation of the air refrigerant cooling apparatus 310 according to the present embodiment will be described.

The air refrigerant cooling apparatus 310 of the present embodiment is designed for achieving high operational efficiency by the high-speed rotation. The high reliability is required in the actual operation.

First, electromagnetic force is generated between the shaft 344 installed in the motor casing 341 of the motor 340 and a coil (not shown) provided around the stator 348, which is the rotational force for driving the shaft. The rotational driving force causes the shaft 344 of the motor 340 to rotate against the stator 348. In the actual operation, the shaft 344 is held in space with keeping a certain distance from the magnetic bearings in the radial direction and the axial direction due to the radial magnetic bearings 345a, 345b, 345c, and 345d and the axial magnetic bearings 347a, 347b, 347c, and 347d.

In the present embodiment, as described above, the radial sensors 349c and 349d and the axial sensors 349a and 349b are provided adjacent to the radial magnetic bearings 345a, 345b, 345c, and 345d, and the axial magnetic bearings 347a, 347b, 347c, and 347d in order to keep the distance between the above-mentioned magnetically floating shaft 344 and respective of the radial magnetic bearings 345a, 345b, 345c, and 345d and the axial magnetic bearings 347a, 347b, 347c, and 347d for the purpose of improving the operational reliability of the motor 340 during the actual operation of the high-speed rotation. The locations of the shaft 344 in the radial and the axial directions are monitored by the radial sensors 349c and 349d and the axial sensors 349a and 349b during the operation. The obtained data indicative of the locations of the shaft 344 are inputted to a processing unit (not shown). On the basis of the inputted location data of the shaft 344, the processing unit calculates at real time how much displacement of the shaft 344 is necessary in order to set the shaft 344 from its current position back to a predetermined position by controlling the radial magnetic bearings 345*a*, 345*b*, 345*c*, and 345*d*, and the axial magnetic bearings 347*a*, 347*b*, 347*c*, and 347*d*. The data of current variation calculated by the processing unit (not shown) is inputted to a controller which is not shown. Then, based on the data indicative of the locations of the shaft 344 in the radial and the axial directions, currents flowing the respective magnetic bearings are controlled by the controller (not shown), which keeps the shaft 344 stably at the predetermined position.

When the motor 340 is in action, the rotation of the shaft 344 causes heat within the motor 340. For the purpose of exhausting the heat occurred in the motor 340, the motor casing 341 is provided with a cooling air vent 370*a* and a cooling air vent 370*b*. When the motor 340 is in action, a cooling air (130 mmAq, 40° C.) is supplied from a fan 360 provided outside the air refrigerant cooling apparatus 310 into the motor 340 through a filter 350 and the cooling air vent 370*a*. After supplied into the motor 340 and cooling down the shaft 344 and the stator 348 which are the motor driver, the cooling air is exhausted to the outside of the motor casing 341 through the cooling air vent 370*b*.

According to the air refrigerant cooling apparatus 310 in the present embodiment, as in the case of the air refrigerant cooling apparatus 210 in the first embodiment, it is necessary to generate pressure difference between the inside of the motor and respective of the compressor 322 and the expansion turbine 332 in order to remove the contamination which moves into the motor 340 from the outside of the motor 340 through a labyrinth-A 342 and a labyrinth-B 343. Moreover, according to the present embodiment, it is necessary to keep at an assured temperature the radial sensors 349*c* and 349*d* and the axial sensors 349*a* and 349*b* provided adjacent to the radial magnetic bearings 345*a*, 345*b*, 345*c*, and 345*d*, and the axial magnetic bearings 347*a*, 347*b*, 347*c*, and 347*d*.

According to the present embodiment, as in the first embodiment, an air refrigerant (−173 mmAq, 35° C.) is supplied to the inlet in the axial direction of the compressor 322. The air refrigerant is compressed in the compressor 322 and its temperature increases up to 119° C. Then, the air refrigerant is exhausted from a compressor vent 321*c* to the outside of the compressor 322. Also, the air refrigerant (−47° C.) is adiabatically expanded in the expansion turbine 332, and thus is cooled down to −80° C. Then, the adiabatically expanded air refrigerant at the temperature of −80° C. is exhausted from the turbine outlet in the axial direction to the outside of the expansion turbine 332. The portions between the motor 340 and respective of the compressor 322 and the expansion turbine 332 are shielded by respective of the labyrinth-A 342 and the labyrinth-B 343 in order to prevent the compressed air refrigerant and the adiabatically expanded air refrigerant from flowing into the motor 340 when the air refrigerant is compressed in the compressor 322 and adiabatically expanded in the expansion turbine 332. It may however happen that a portion of the air refrigerant leaks into the motor 340 from the outside through the labyrinth-A 342 and the labyrinth-B 343. As a result, the air refrigerant at high or low temperature may have an influence on the radial sensors 349*c* and 349*d* and the axial sensors 349*a* and 349*b*.

According to the present embodiment, the motor casing 341 is provided with air vents 341*a*, 341*b*, 341*c*, and 341*d* for the purpose of removing the above-mentioned contamination and for keeping the operating temperature of the radial sensors 349*c* and 349*d* and the axial sensors 349*a* and 349*b*. The air vents 341*a*, 341*b*, 341*c*, and 341*d* are provided adjacent to the radial magnetic bearings 345*a*, 345*b*, 345*c*, and 345*d* and the axial magnetic bearings 347*a*, 347*b*, 347*c*, and 347*d*. The air vents 341*c* and 341*d* are connected to a fan 360 through a filter 350 by using pipes. Thus, the contamination around the shaft 344, the radial magnetic bearings 345*a*, 345*b*, 345*c*, and 345*d*, and the axial magnetic bearings 347*a*, 347*b*, 347*c*, and 347*d* of the motor 340 is exhausted to the outside of the motor casing 341 through the air vents 341*a* and 341*b* due to the difference between pressure outside the motor casing 341 and pressure inside the motor casing 341. According to the present embodiment, since the air vents 341*a*, 341*b*, 341*c*, and 341*d* are located adjacent to the radial magnetic bearings 345*a*, 345*b*, 345*c*, and 345*d* and the axial magnetic bearings 347*a*, 347*b*, 347*c*, and 347*d*, the air refrigerant at high and low temperature entering through the labyrinth-A 342 and the labyrinth-B can be prevented from staying around the radial sensors 349*c* and 349*d* and the axial sensors 349*a* and 349*b* provided in the proximity of the respective bearings.

In the present embodiment, the air refrigerant around the sensors is forcibly exhausted to the outside of the motor casing by the positive pressure from the fan 360 as mentioned above. Also, negative pressure may be applied near the sensors by using a compressor or an aspiration fan in order to generate a pressure difference between the space around the sensors and the outside of the motor casing. Thus, the air refrigerant at high or low temperature entering through the labyrinth-A 342 and the labyrinth-B can be prevented from staying around the sensors. When the negative pressure is applied by the compressor and the like, the contamination moved into the motor can be quickly exhausted to the outside of the motor. When the positive pressure is applied by the fan and the like, the air refrigerant at high or low temperature from the labyrinth sections is prevented from moving around the sensors.

In the present embodiment, a pressure difference is generated between the inside and the outside of the motor in order to remove the contamination which moves into the motor 340 from the outside through the labyrinth-A 342 and the labyrinth-B 343. Furthermore, according to the present embodiment, for the purpose of preventing the air refrigerant at high or low temperature entering through the labyrinth-A 342 and the labyrinth-B from staying around the sensors, the positive or the negative pressure is forcibly applied to spaces within the motor casing 341 near the sensors by using the external fan and the like. Thus, the air refrigerant at high or low temperature is exhausted to the outside of the motor casing 341. As described above, it is possible to keep the high-speed rotation in the motor 340 and hence to attain the air refrigerant cooling apparatus 310 having higher efficiency and higher reliability than the first embodiment.

Third Embodiment

FIG. 2 is a schematic view of the air refrigeration system 100 according to the third embodiment.

The air refrigeration system 100 of present embodiment includes the air refrigerant cooling apparatus 210 of the first embodiment or the air refrigerant cooling apparatus 310 of the second embodiment, a first heat exchanger 120, a second heat exchanger 130, a refrigerator 140, a filter 150, and a fan 160.

The refrigerant in the present embodiment is air, which can eliminate the destruction of environment due to ozone refrigerant which has been conventionally used.

In the present embodiment, an outlet of the compressor in the air refrigerant cooling apparatus 210 or 310 is connected to an inlet of the first heat exchanger 120 through a conduit. An outlet of the first heat exchanger 120 is connected to an inlet of the second heat exchanger 130 through a conduit. An outlet of the second heat exchange 130 is connected to an inlet of the expansion turbine in the air refrigerant cooling apparatus 210 or 310 through a conduit. An outlet of the expansion turbine in the air refrigerant cooling apparatus 210 or 310 is connected to an air refrigerant inlet of the refrigerator 140 through a conduit. Also, an air refrigerant outlet of the refrigerator 140 is connected to an inlet of the compressor in the air refrigerant cooling apparatus 210 or 310 via the second heat exchanger 130 by the use of a conduit. Also, the air inlet provided on the motor casing is connected to the fan 160 through the filter 150 in order to cool down the inside of the motor of the air refrigerant cooling apparatus 210 or 310.

Next, the principle of operation of the air refrigeration system 100 according to the present embodiment will be described. The air refrigeration system 100 of present embodiment is a circulation type system which uses an air as the refrigerant. The refrigerator 140 is incorporated into a circulation loop, and thus the air refrigerant is directly supplied to the refrigerator 140. Here, the refrigerator includes a freezer, a refrigerating chamber and so on. For example, the refrigerator 140 may be not only provided for keeping products at lower temperatures but also designed of a half-closed type for freezing food products conveyed on a belt conveyor through a space cooled by the air refrigerant cooling apparatus 210 or 310 so that the food products turn to frozen products. Furthermore, the refrigerator 140 may be used as a medical product processing apparatus for freezing medical products during the production.

First, the air refrigerant at a temperature of 35° C. (−173 mmAq) is supplied to the inlet of the compressor in the air refrigerant cooling apparatus 210 (310), and is compressed by the compressor. Then, the compressed air refrigerant at a temperature of 119° C. is outputted from the outlet of the compressor. The outputted air refrigerant at 119° C. is transferred to the first heat exchanger 120, and is cooled down to 43° C. by the first heat exchanger 120. The air refrigerant cooled down to 43° C. is transferred to the second heat exchanger 130. Then, the air refrigerant is further heat-exchanged and is cooled down to about −47° C. The air refrigerant cooled down to −47° C. is transferred to the inlet of the expansion turbine of the air refrigerant cooling apparatus 210 (310). Then, the air refrigerant is adiabatically expanded and hence is cooled down to −80° C. The air refrigerant cooled down to −80° C. is supplied to the refrigerator 140, and directly cools down the products stored in the refrigerator 140. In the present embodiment, the temperature in the refrigerator 140 is kept at near −55° C. The air refrigerant at the temperature of −55° C. outputted from the refrigerator 140 is transferred to the second heat exchanger 130, and is heat-exchanged with the air refrigerant from the first heat exchanger 120. As a result, the air refrigerant from the first heat exchanger 120 is cooled down to −47° C. Then, the air refrigerant outputted from the refrigerator 140, which is heat-exchanged at the second heat exchanger 130 and is warmed up to 35° C., is supplied to the inlet of the compressor of the air refrigerant cooling apparatus 210 (310) again. Thus, the circulation of the air refrigerant is established. Meanwhile, the cooling air for cooling the inside of the motor is supplied from the fan 160 into the motor through the filter 150. After cooling down the inside of the motor, the cooling air is released from the inside of the motor to the atmosphere.

The air is employed as the refrigerant in the present embodiment, which eliminates deterioration of environment as compared with the conventional refrigerant such as chlorofluorocarbon and the like. Also, the air refrigerant cooling apparatus 210 or 310 shown in the first embodiment or the second embodiment is used. Thus, it is possible to provide the air refrigeration system 100 having high efficiency and high reliability which can cool the inside of the refrigerator 140 to a desired temperature with minimum number of heat exchangers.

Also, the system of the present embodiment has essentially a simple configuration. Therefore, overall equipment expenses can be reduced. Also, the air refrigerant with the low temperature is directly supplied into the refrigerator 140. Thus, it is not necessary to provide an unit cooler and a refrigerant pipe in a storehouse. It is therefore possible to considerably reduce the cost for construction.

Furthermore, the magnetic bearings are employed in the air refrigerant cooling apparatus 210 (310). It is therefore possible to considerably reduce the cost of maintenance such as checking the bearings which is necessary for mechanical bearings, replacing the shaft and ball bearings, changing lubricant oil necessary for the mechanical bearings, and so on.

Fourth Embodiment

Figure 5:
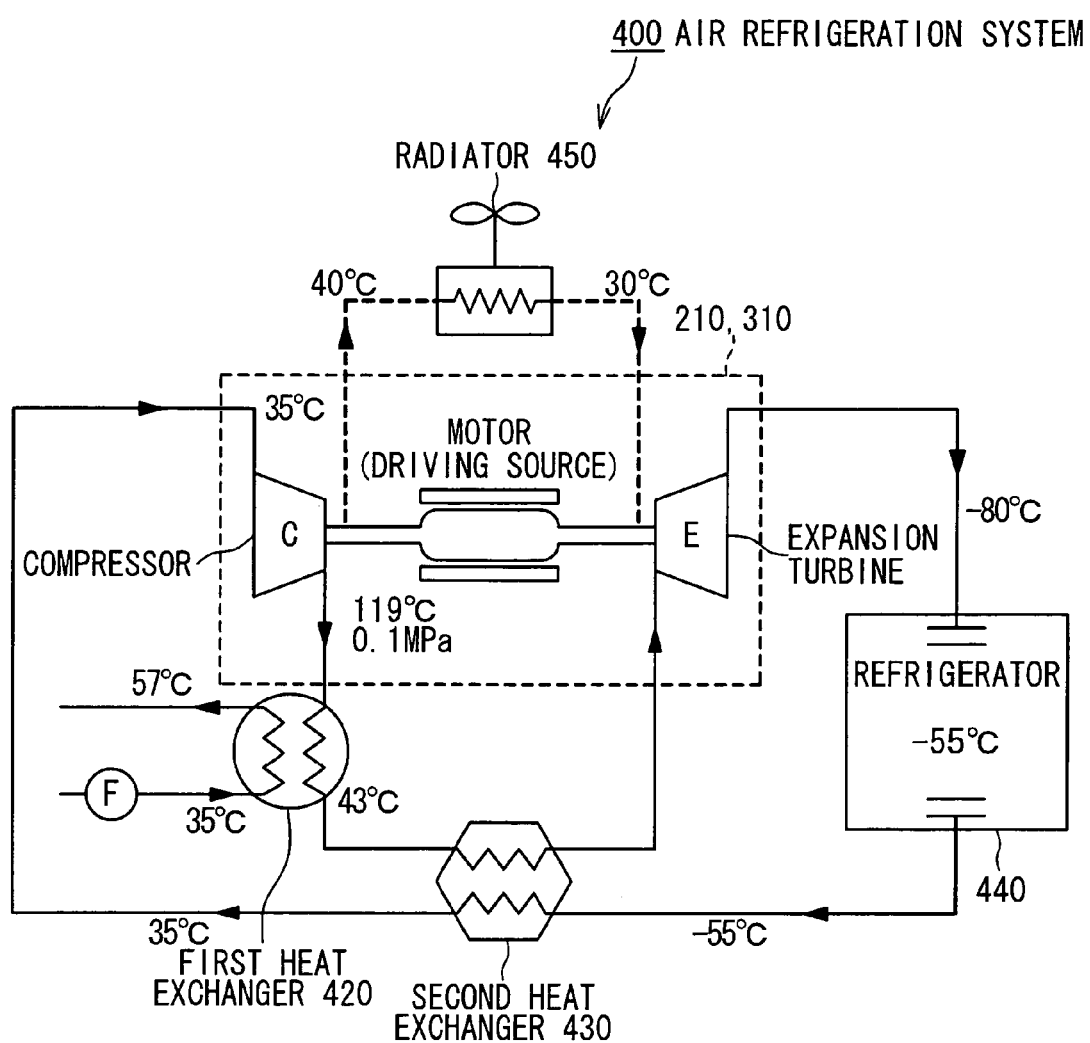
FIG. 5 illustrates an air refrigeration system according to a fourth embodiment of the present invention.

FIG. 5 is a schematic view of an air refrigeration system 400 according to the fourth embodiment of the present invention.

The air refrigeration system 400 of the present embodiment is substantially identical in the configuration to the air refrigeration system 100 of the third embodiment, except that there is a difference in the configuration for cooling the motor of the air refrigerant cooling apparatus 210 (310).

The air refrigeration system 400 according to the present embodiment includes the air refrigerant cooling apparatus 210 or 310 of the first embodiment or the second embodiment, a first heat exchanger 420, a second heat exchanger 430, a refrigerator 440, and a radiator 450 for cooling the motor in the air refrigerant cooling apparatus 210 or 310.

The configuration and the principle of operation according to the present embodiment are similar to those of the air refrigeration system 100 according to the third embodiment, and their detailed explanation is omitted here.

In the present embodiment, the radiator 450 is provided outside the air refrigerant cooling apparatus 210 (310). An inlet and an outlet of the radiator 450 are connected to air vents which are provided on the motor casing and are associated with respective of the inlet and the outlet. During the operation of the air refrigeration system 400, the radiator 450 is concurrently driven for circulating the air in the motor of the air refrigerant cooling apparatus 210 (310). Also, the cooling air at a temperature of 40° C. exhausted from the inside of the motor is cooled down to 30° C. by the radiator 450.

According to the present embodiment, the same effects as the third embodiment can be obtained. In addition, the efficiency of cooling the motor in the air refrigerant cooling apparatus 210 (310) can be increased. Therefore, it is possible to provide the air refrigeration system 400 having higher reliability as compared with the air refrigeration system 100 according to the third embodiment.

Fifth Embodiment

Figure 6:
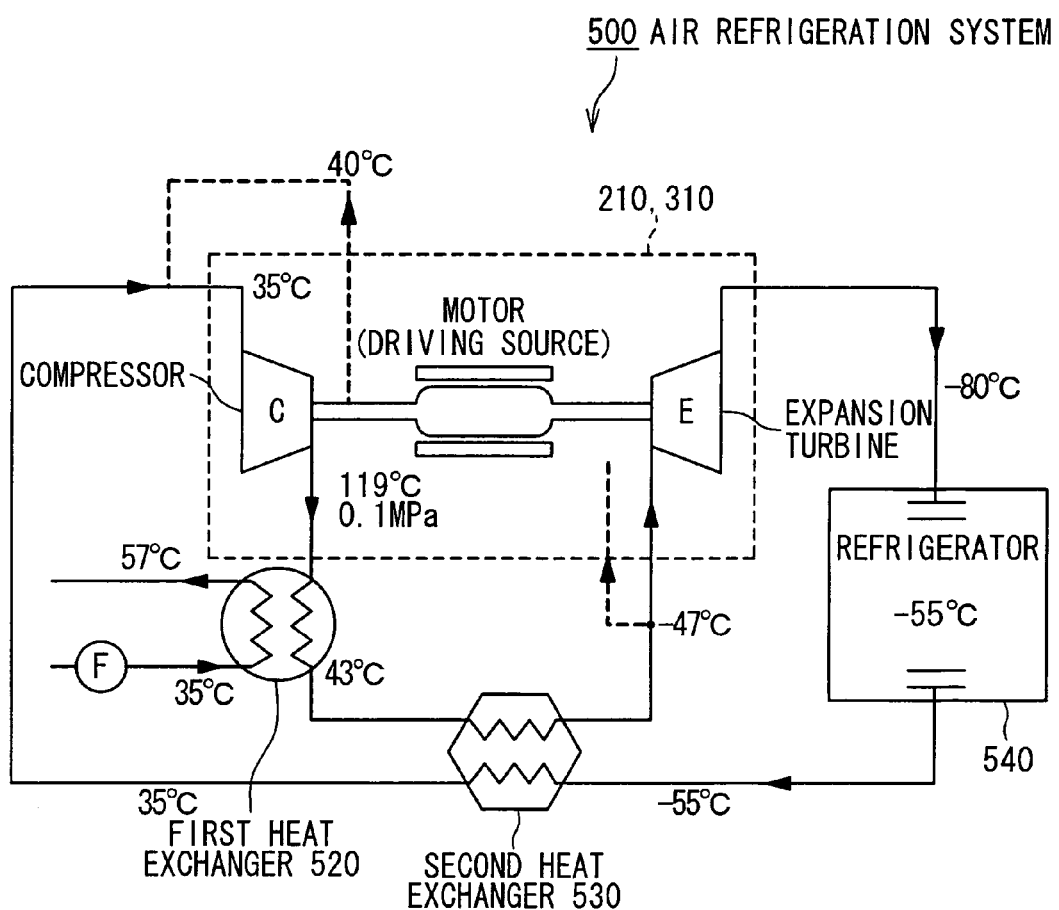
FIG. 6 illustrates an air-refrigeration system according to a fifth embodiment of the present invention.

FIG. 6 is a schematic view of an air refrigeration system 500 according to the fifth embodiment of the present invention.

The air refrigeration system 500 of the present embodiment is substantially identical in the configuration to the air refrigeration system 100 of the third embodiment and the air refrigeration system 400 of the fourth embodiments, except that there is a difference in the configuration for cooling the motor of the air refrigerant cooling apparatus 210 (310).

The air refrigeration system 500 according to the present embodiment includes the air refrigerant cooling apparatus 210 or 310 of the first embodiment or the second embodiment, a first heat exchanger 520, a second heat exchanger 530, and a refrigerator 540.

The configuration and the principle of operation according to the present embodiment are similar to those of the air refrigeration system 100 according to the third embodiment, and their detailed explanation is omitted here.

In the present embodiment, the pipe connected to the outlet of the second heat exchanger 530 is divided into two branches; one is connected to the inlet of the expansion turbine of the air refrigerant cooling apparatus 210 (310), and the other is connected to an air vent provided on the motor casing. Also, the inlet of the compressor of the air refrigerant cooling apparatus 210 (310) is connected through a pipe to an air vent provided on the motor casing of the air refrigerant cooling apparatus 210 (310).

Accordingly, during the operation of the air refrigeration system 500, a part of the air refrigerant at the temperature of −47° C. outputted from the second heat exchanger 530 is supplied into the motor of the air refrigerant cooling apparatus 210 (310), and cools down the motor. After cooling down the motor, the air refrigerant whose temperature becomes about 40° C. is exhausted from the motor and is transferred to the inlet of the compressor of the air refrigerant cooling apparatus 210 (310) again. According to the present embodiment, as described above, the air refrigerant not only keeps the inside of the refrigerator 540 at a low temperature but also cools down the inside of the motor of the air refrigerant cooling apparatus 210 (310).

According to the present embodiment, the same effects as the third and the fourth embodiments can be obtained. In addition, it is possible to cool down the inside of the motor of the air refrigerant cooling apparatus 210 (310) more efficiently by utilizing the circulation of the air refrigerant. It is therefore possible to provide the air refrigeration system 500 having higher reliability with lower equipment expenses as compared with the air refrigeration systems 100 and 400 according to the third and the fourth embodiments.

Sixth Embodiment

Figure 7:
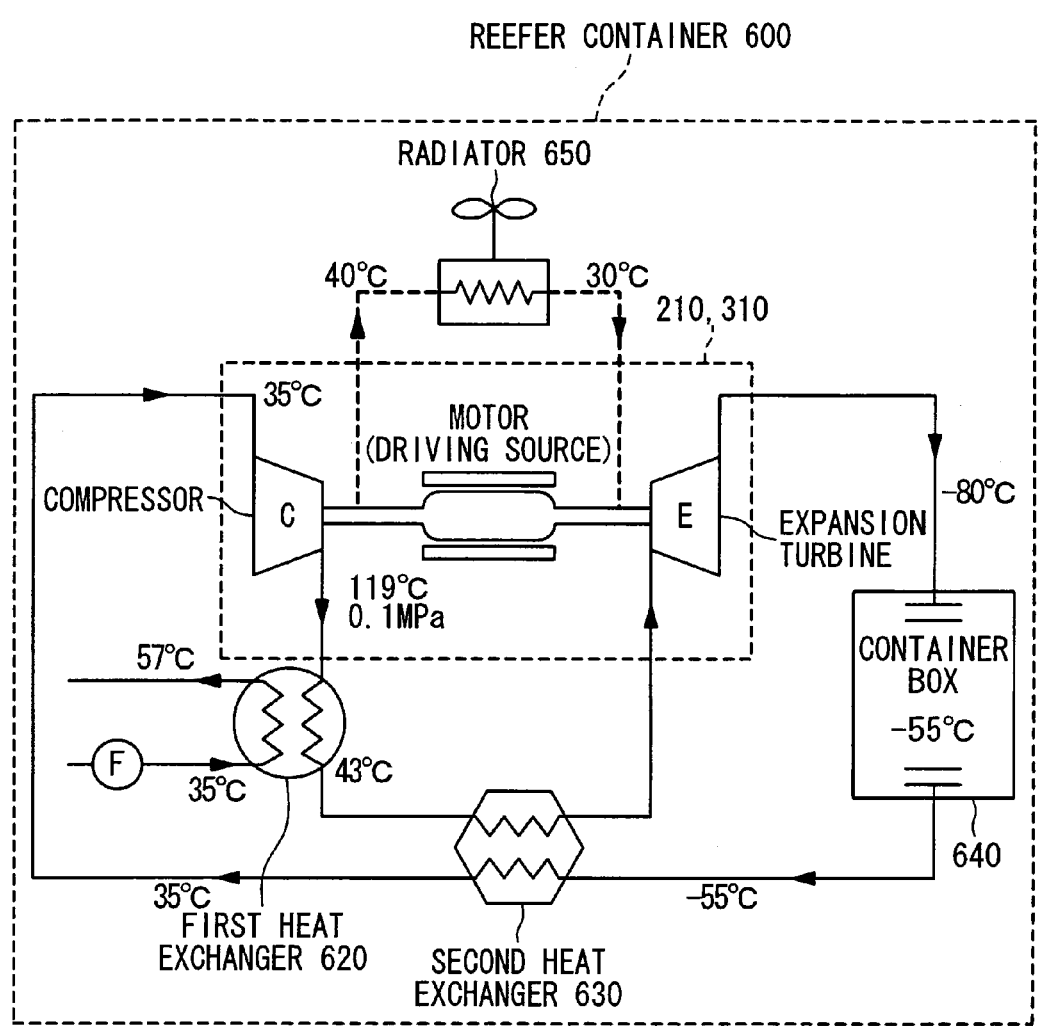
FIG. 7 illustrates a refrigerator container according to a sixth embodiment of the present invention.

FIG. 7 is a schematic view of a refrigerator container (reefer container) 600 according to the sixth embodiment of the present invention.

The refrigerator container 600 of the present embodiment is substantially identical in the configuration to the air refrigeration system 400 of the fourth embodiment, except that the whole system is configured to be transportable.

The refrigerator container 600 according to the present embodiment includes the air refrigerant cooling apparatus 210 or 310 of the first embodiment or the second embodiment, a first heat exchanger 620, a second heat exchanger 630, a container box 640, and a radiator 650 for cooling the motor of the air refrigerant cooling apparatus 210 or 310.

The configuration and the principle of operation according to the present embodiment are similar to those of the air refrigeration system 100 according to the third embodiment and the air refrigeration system 400 according to the fourth embodiment, and their detailed explanation is omitted here.

In the present embodiment, the radiator 650 is provided outside the air refrigerant cooling apparatus 210 (310). An inlet and an outlet of the radiator 650 are connected to air vents which are provided on the motor casing and are associated with respective of the inlet and the outlet. During the operation of the refrigerator container 600, the radiator 650 is concurrently driven for circulating the air in the motor of the air refrigerant cooling apparatus 210 (310). Also, the cooling air at a temperature of 40° C. exhausted from the inside of the motor is cooled down to 30° C. by the radiator 650.

Moreover, in the present embodiment, all of the air refrigerant cooling apparatus 210 (310), the first heat exchanger 620, the second heat exchanger 630, the container box 640, and the radiator 650 are configured to be transportable. The whole system can be loaded on a vehicle, a vessel, or a train. It is therefore possible to carry products with freezing in the container box 640.

Since the whole system is transportable according to the present embodiment, the air refrigeration system having high reliability can be applied to a refrigeration transportation whose demand is expected to grow in the future. It should be noted that, although only a case of freezing is explained, the present embodiment can be similarly applied to the refrigeration and the air conditioning by adjusting the temperature/pressure levels as in the other embodiments.

Seventh Embodiment

Figure 8:
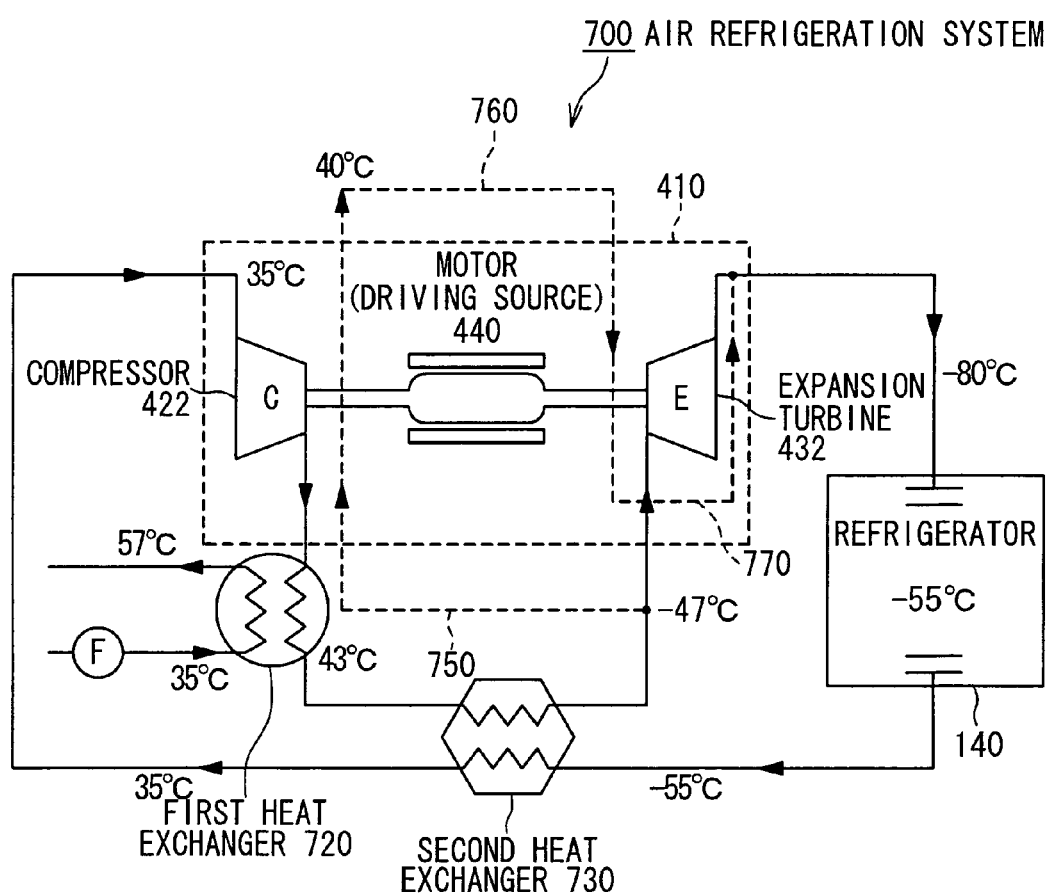
FIG. 8 illustrates an air refrigeration system according to a seventh embodiment of the present invention.

FIG. 8 is a schematic view of an air refrigeration system 700 according to the seventh embodiment of the present invention. The air refrigeration system 700 of the present embodiment includes an air refrigerant cooling apparatus 410, a first heat exchanger 720, a second heat exchanger 730, and a refrigerator 740. The air refrigerant cooling apparatus 410 has a compressor 422 and an expansion turbine 432.

An outlet of the compressor 422 in the air refrigerant cooling apparatus 410 is connected to an inlet of the first heat exchanger 720 through a conduit. An outlet of the first heat exchanger 720 is connected to an inlet of the second heat exchanger 730 through a conduit. An outlet of the second heat exchange 730 is connected to an inlet of the expansion turbine 432 in the air refrigerant cooling apparatus 410 through a conduit. An outlet of the expansion turbine 432 in the air refrigerant cooling apparatus 410 is connected to an air refrigerant inlet of the refrigerator 740 through a conduit. Also, an air refrigerant outlet of the refrigerator 740 is connected to an inlet of the compressor 422 in the air refrigerant cooling apparatus 410 via the second heat exchanger 730 by the use of a conduit. Also, an air vent provided on the motor casing is connected to a fan through a filter in order to cool down the inside of the motor 440 of the air refrigerant cooling apparatus 410.

The air refrigeration system 700 of present embodiment has a conduit 750 which diverges from a conduit connecting between the second heat exchanger 730 and the expansion turbine 432. The conduit 750 derives the air refrigerant and supplies it to a space where the magnetic bearings on the side of the compressor 422 of the motor 440 are provided. The air refrigeration system 700 further has a conduit 760 which derives the air refrigerant from the space where the magnetic bearings on the side of the compressor 422 of the motor 440 are provided to a space where the magnetic bearings on the side of the expansion turbine 432 of the motor 440 are provided. The air refrigeration system 700 further has a conduit 770 which derives the air refrigerant from the space where the magnetic bearings on the side of the expansion turbine 432 of the motor 400 are provided to a conduit connecting the expansion turbine 432 and the refrigerator 740.

Figure 9:
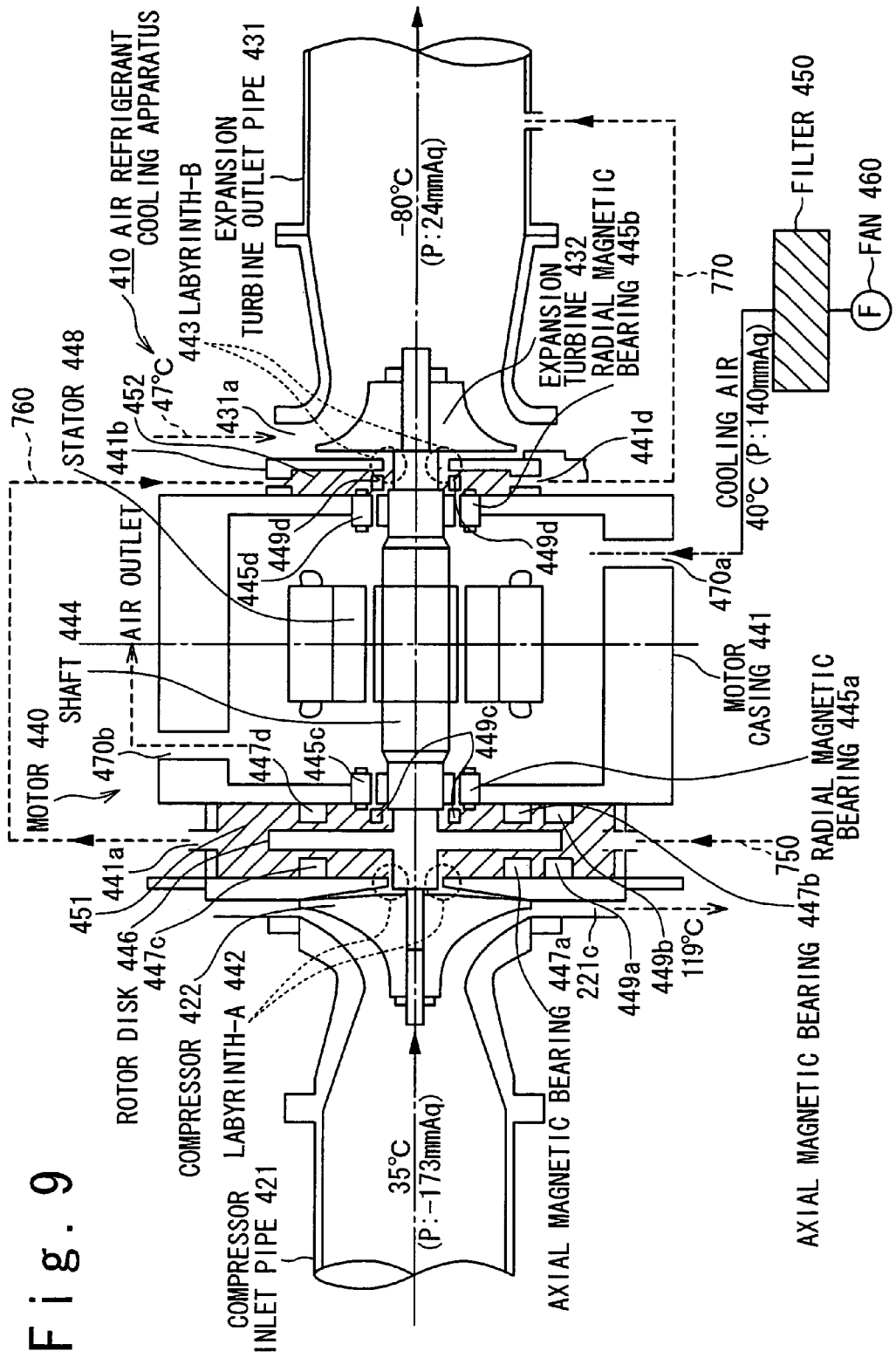
FIG. 9 is a cross sectional view schematically showing an air refrigerant cooling apparatus according to the seventh embodiment.

FIG. 9 is a cross sectional view schematically showing the air refrigerant cooling apparatus 410 according to the present embodiment. The air refrigerant cooling apparatus 410 of the present embodiment has the motor 440, the compressor 422, and the expansion turbine 432. The motor 440 is a synchronous motor of which revolution speed is about 21000 rpm. The compressor 422 is connected to one axial end of the motor 440 and joined to a shaft 444 of the motor 440. The compressor 422 is connected at the inlet side to a compressor inlet pipe 421.

The expansion turbine 432 is connected to the other axial end of the motor 440 opposite to the compressor 422 and joined to the shaft 444 of the motor 440. The motor 440 is located between the compressor 422 and the expansion turbine 432. The motor 440 includes the shaft 444 accommodated as a rotating member in a motor casing 441 and a stator 448 for driving the shaft 444.

The motor 440 also includes radial magnetic bearings 445a and 445c which support the radial load of the shaft 444 on the side of the compressor 422. A first magnetic bearing room 451 is provided at the opposite side of the stator 448 with regard to the radial magnetic bearings 445a and 445c. The first magnetic bearing room 451 is separated by a labyrinth-A 442 from the space where the compressor 422 is provided. The labyrinth-A 442 prevents the air refrigerant compressed by the compressor 422 from flowing into the motor 440. Provided in the first magnetic bearing room 451 are a rotor disk 446 connected to the shaft 444 and axial magnetic beatings 447a and 447b which support the axial load of the shaft 444 via the rotor disk 446.

The motor 440 further has radial magnetic bearings 445b and 445d which support the radial load of the shaft 444 on the side of the expansion turbine 432. A second magnetic bearing room 452 is provided at the opposite side of the stator 448 with regard to the radial magnetic bearings 445b and 445d. The second magnetic bearing room 452 is separated by a labyrinth-B 443 from the space where the expansion turbine 432 is provided. The labyrinth-B 443 prevents the air refrigerant adiabatically expanded in the expansion turbine 432 from flowing into the motor 440.

Radial sensors 449c are provided in the first magnetic bearing room 451 for detecting the distance between the shaft 444 and respective of the radial magnetic bearings 445a and 445c. In addition, axial sensors 449a and 449b are provided in the first magnetic bearing room 451 for detecting the distance along the axial direction between the rotor disk 451 and the inner wall of the first magnetic bearing room 451.

Radial sensors 449d are provided in the second magnetic bearing room 452 for detecting the distance between the shaft 444 and respective of the radial magnetic bearings 445b and 445d.

The first magnetic bearing room 451 in which the radial sensors 449c and the axial sensors 449a and 449b are provided is connected at an opening to one end of the conduit 750. The other end of the conduit 750 is connected to a conduit joining between the second heat exchanger 730 and the expansion turbine 432, which is not shown in FIG. 9. The first magnetic bearing room 451 has an outlet 441a spaced from the one end of the conduit 750. The outlet 441a is connected to one end of a conduit 760.

The other end of the conduit 760 is connected to an inlet 441b provided for the second magnetic bearing room 452. The second magnetic bearing room 452 has an outlet 441d spaced from the other end of the conduit 760. The outlet 441d is connected to one end of a conduit 770. The other end of the conduit 770 is connected to the expansion turbine outlet pipe 431.

Next, the principle of operation of the air refrigerant cooling apparatus 700 of the present embodiment will be described.

The motor 440 is driven. Then, the compressor 422 and the expansion turbine 432 are rotated.

Electromagnetic force is generated between the shaft 444 installed in the motor casing 441 of the motor 440 and a coil (not shown) provided around the stator 448, which is the rotational force for driving the shaft. The rotational driving force causes the shaft 444 of the motor 440 to rotate against the stator 448. In the actual operation, the shaft 444 is held in space with keeping a certain distance from the magnetic bearings in the radial direction and the axial direction due to the radial magnetic bearings 445a, 445b, 445c, and 445d and the axial magnetic bearings 447a, 447b, 447c, and 447d.

The locations of the shaft 444 in the radial and the axial directions are monitored by the radial sensors 449c and 449d and the axial sensors 449a and 449b during the operation. The obtained data indicative of the locations of the shaft 444 are inputted to a processing unit (not shown). On the basis of the inputted location data of the shaft 444, the processing unit calculates at real time how much displacement of the shaft 444 is necessary in order to set the shaft 444 from its current position back to a predetermined position by controlling the radial magnetic bearings 445a, 445b, 445c, and 445d, and the axial magnetic bearings 447a, 447b, 447c, and 447d. The data of current variation calculated by the processing unit (not shown) is inputted to a controller which is not shown. Then, based on the data indicative of the locations of the shaft 444 in the radial and the axial directions, currents flowing the respective magnetic bearings are controlled by the controller (not shown), which keeps the shaft 444 stably at the predetermined position.

When the motor 440 is in action, the rotation of the shaft 444 causes heat within the motor 440. For the purpose of exhausting the heat occurred in the motor 440, the motor casing 441 is provided with a cooling air vent 470a and a cooling air vent 470b. When the motor 440 is in action, a cooling air (130 mmAq, 40° C.) is supplied from a fan 460 provided outside the air refrigerant cooling apparatus 410 into the motor 440 through a filter 450 and the cooling air vent 470a. After supplied into the motor 440 and cooling down the shaft 444 and the stator 448 which are the motor driver, the cooling air is exhausted to the outside of the air refrigerant cooling apparatus 410 through the cooling air vent 470b.

The air refrigerant at a temperature of 35° C. (Pressure; −173 mmAq) is supplied to the inlet of the compressor 422, and is compressed by the compressor 422. Then, the compressed air refrigerant at a temperature of 119° C. is outputted from the outlet of the compressor 422. The outputted air refrigerant at 119° C. is transferred to the first heat exchanger 720, and is cooled down to 43° C. by the first heat exchanger 720. The air refrigerant cooled down to 43° C. is transferred to the second heat exchanger 730. Then, the air refrigerant is further heat-exchanged and is cooled down to about −47° C. The air refrigerant cooled down to −47° C. is transferred to the inlet 431a of the expansion turbine of the air refrigerant cooling apparatus 410. Then, the air refrigerant is adiabatically expanded and hence is cooled down to −80° C. The air refrigerant cooled down to −80° C. is supplied to the refrigerator 740, and directly cools down the products stored in the refrigerator 740. In the present embodiment, the temperature in the refrigerator 740 is kept at near −55° C. The air refrigerant at the temperature of −55° C. outputted from the refrigerator 740 is transferred to the second heat exchanger 730, and is heat-exchanged with the air refrigerant from the first heat exchanger 720. As a result, the air refrigerant from the first heat exchanger 720 is cooled down to −47° C. Then, the air refrigerant outputted from the refrigerator 740, which is heat-exchanged at the second heat exchanger 730 and is warmed up to 35° C., is supplied to the inlet of the compressor of the air refrigerant cooling apparatus 410 again. Thus, the circulation of the air refrigerant is established.

In the normal operation mode, the pressure in the first magnetic bearing room 451 is lower than that in the conduit connecting between the second heat exchanger 730 and the expansion turbine 432. Therefore, a part of the air refrigerant is derived from the conduit connecting between the second heat exchanger 730 and the expansion turbine 432 to the conduit 750, and is supplied to the first magnetic bearing room 451. The temperature of the air refrigerant supplied to the first magnetic bearing room 451 is as low as −47° C., and thus the air refrigerant contains less moisture. The inside of the first magnetic bearing room 451 is cooled down by the supplied air refrigerant.

As the inside of the first magnetic bearing room 451 is cooled down, the radial sensors 449c, the axial sensor 449a and the axial sensor 449b are cooled down. Accordingly, the operations of the radial sensors 449c and the axial sensors 449a and 449b become stable. Or, cheaper sensors with narrower operating temperature range can be used as the radial sensor 449c and the axial sensors 449a and 449b, thus contributing to the overall cost-down.

The pressure in the first magnetic bearing room 451 is higher than that of the second magnetic bearing room 452. As a result, the air inside the first magnetic bearing room 451 is outputted to the conduit 760. In the first magnetic bearing room 451, the air flows from the conduit 750 to the conduit 760, and thus the contamination is blown off.

The temperature of the air outputted from the first magnetic bearing room 451 to the conduit 760 is about 40° C. Since the air with low temperature and low moisture supplied from the conduit 750 is warmed up in the first magnetic bearing room 451, the moisture level of the air outputted to the conduit 760 is extremely low. The air is supplied to the second magnetic bearing room 452.

A portion of the air refrigerant may be leaked from the expansion turbine 431 across the labyrinth-B 443 to the second magnetic bearing room 452. The leaked air refrigerant is very low in the temperature, which may cause the development of frosts on the inner wall of the second magnetic bearing room 452. The air with extremely low moisture and at the temperature of about 40° C. is supplied from the conduit 760, which can prevent the development of the frosts. As the development of the frosts is prevented, the rotation of the shaft against the radial magnetic bearing 445b can be improved in the stability. Particularly, in a case when a motor rotating at as a high speed as 21000 rpm is used, extremely high precision of the bearing stability is required. It is hence desirable that the weight balance is held with high precision by the shaft prevented from being frosted. Moreover, the air with extremely low moisture is supplied, which suppresses the development of rust in the second magnetic bearing room 452.

The pressure in the second magnetic bearing room 452 is higher than that in the expansion turbine outlet pipe 431. Therefore, the air in the second magnetic bearing room 452 is outputted to the conduit 770, and is supplied to the expansion turbine outlet pipe 431. Accordingly, the air drawn out from the conduit 750 in the air refrigerant circulation can be returned back to the circulation through the conduit 770, which ensures the stable action of the circulation.

Eighth Embodiment

Figure 10:
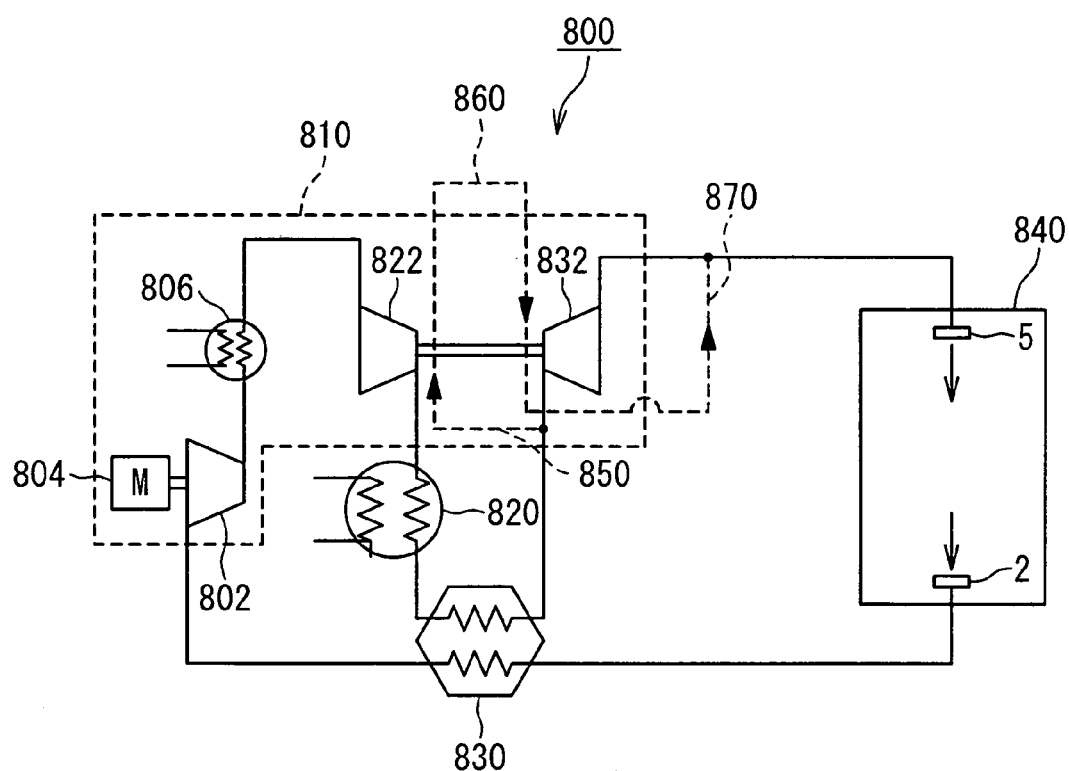
FIG. 10 illustrates an air refrigeration system according to an eighth embodiment of the present invention.

FIG. 10 illustrates an air refrigeration system according to the eighth embodiment of the present invention.

The air refrigeration system 800 of the present embodiment has an air refrigerant cooling apparatus 810. The air refrigerant cooling apparatus 810 includes an auxiliary compressor 802, a motor 804, an auxiliary cooler 806, a main compressor 822, and an expansion turbine 832. The auxiliary compressor 802 is driven by the motor 804. The auxiliary compressor 802 is connected at the outlet to the auxiliary cooler 806 through a conduit. An outlet of the auxiliary cooler 806 is connected to the main compressor 822 through a conduit. The main compressor 822 is coaxially joined to the expansion turbine 832. The bearings which support a shaft connecting the main compressor 822 and the expansion turbine 832 can be ball bearings, roller bearings, or magnetic bearings.

An outlet of the main compressor 822 is connected to a cooler 820 via a conduit. An outlet of the cooler 820 is connected to a higher temperature side passage of a heat exchanger 830. An outlet of the higher temperature side passage of the heat exchanger 830 is connected to the expansion turbine 832. An outlet of the expansion turbine 832 is connected to an air outlet 5 of the refrigerator 840. The refrigerator 840 has an air vent 2, and the air vent 2 is connected to a lower temperature side passage of the heat exchanger 830 via a conduit. An outlet of the lower temperature side passage of the heat exchanger 830 is connected to the auxiliary compressor 802.

One end of a conduit 870 is connected to an opening of the conduit joining between the expansion turbine 832 and the refrigerator 840. The other end of the conduit 870 is connected to a bearing space (a first bearing room) between the compressor 822 and the expansion turbine 832. One end of a conduit 860 is connected to the first bearing room at an opening located apart from a point to which a conduit 850 is connected. The other end of the conduit 860 is connected to a space (a second bearing room, not shown) on the side of the expansion turbine 832. The second bearing room is also communicated with one end of the conduit 870 spaced from the inlet of the conduit 860. The outlet of the conduit 870 is connected to the conduit joining between the expansion turbine 832 and the refrigerator 840.

The principle of operation of the air refrigerant cooling apparatus 800 according to the present embodiment will be explained.

The motor 804 is driven, and the auxiliary compressor 802 is rotated. The main compressor 822 and the expansion turbine 832 are rotated. The auxiliary cooler 806 is initiated. The cooler 820 is initiated.

The air refrigerant is outputted from an outlet of the lower temperature side passage of the heat exchanger 830. The air refrigerant is compressed by the auxiliary compressor 802 and then outputted. The outputted air refrigerant is cooled down by the auxiliary cooler 806. The air refrigerant outputted from the auxiliary cooler 806 is compressed by the main compressor 822 and then outputted. The air refrigerant outputted from the main compressor 822 is cooled down by the cooler 820. The air refrigerant outputted from the cooler 820 is further cooled down by the heat exchanger 830. The air refrigerant cooled down by the heat exchanger 830 is adiabatically expanded in the expansion turbine 832 and is further cooled down. The air refrigerant outputted from the expansion turbine 832 is supplied into the refrigerator 840 through the air outlet 5. The interior of the refrigerator 840 is cooled down. The air in the refrigerator 840 is released from the air vent 2 and is warmed up in the heat exchanger 830. The warmed air refrigerant is then supplied to the auxiliary compressor 802.

A portion of the air refrigerant outputted from the expansion turbine 832 is transferred to the conduit 850 and is supplied to the first bearing room. The air in the first bearing room is outputted to the conduit 860. As the air flows across the first bearing room, the contamination can be blown off. The air outputted from the first bearing room is supplied to the second bearing room via the conduit 860. A portion of the air at a low temperature may be leaked from the expansion turbine 832 at the outlet side to the second bearing room, thus developing frosts. The development of such frosts in the second bearing room can be prevented by the air supplied from the conduit 860. Therefore, the bearings operate stably.

The invention claimed is:

1. An air refrigerant cooling apparatus comprising:
a motor having a first magnetic bearing and a second magnetic bearing for supporting a shaft;
a compressor; and
an expansion turbine,
wherein said compressor is connected to said shaft and separated from said first magnetic bearing by a first labyrinth,
said expansion turbine is connected to said shaft and separated from said second magnetic bearing by a second labyrinth, and
pressure differences are generated between spaces where said first magnetic bearing and said second magnetic bearing are provided and respective of an inlet of said compressor and an outlet of said expansion turbine by an external pressure outside said motor.

2. The air refrigerant cooling apparatus according to claim 1, further comprising sensors for detecting a position of said shaft,
wherein said sensors are provided adjacent to said first magnetic bearing and said second magnetic bearing, and
a pressure difference is generated between a space where said sensors are provided and an outside of a casing of said motor by an external pressure outside said motor.

3. An air refrigeration system comprising:
the air refrigerant cooling apparatus according to claim 1;
a first heat exchanger;
a second heat exchanger;
a refrigerator;
a filter; and
a fan,
wherein an outlet of said compressor in said air refrigerant cooling apparatus is connected to an inlet of said first heat exchanger,
an outlet of said first heat exchanger is connected to an inlet of said second heat exchanger,
an outlet of said second heat exchanger is connected to an inlet of said expansion turbine in said air refrigerant cooling apparatus,
an outlet of said expansion turbine in said air refrigerant cooling apparatus is connected to an inlet of said refrigerator,
an outlet of said refrigerator is connected to an inlet of said compressor in said air refrigerant cooling apparatus through said second heat exchanger, and
said fan supplies fluid into a casing of said motor through said filter.

4. An air refrigeration system comprising:
the air refrigerant cooling apparatus according to claim 1;
a first heat exchanger;
a second heat exchanger;
a refrigerator; and
a radiator,
wherein an outlet of said compressor in said air refrigerant cooling apparatus is connected to an inlet of said first heat exchanger,
an outlet of said first heat exchanger is connected to an inlet of said second heat exchanger,
an outlet of said second heat exchanger is connected to an inlet of said expansion turbine in said air refrigerant cooling apparatus,
an outlet of said expansion turbine in said air refrigerant cooling apparatus is connected to an inlet of said refrigerator,
an outlet of said refrigerator is connected to an inlet of said compressor in said air refrigerant cooling apparatus through said second heat exchanger,
said radiator is provided outside said air refrigerant cooling apparatus, and
an inlet and an outlet of said radiator are connected to air vents which are provided on a casing of said motor and associated with respective of said inlet and said outlet of said radiator.

5. An air refrigeration system comprising:
the air refrigerant cooling apparatus according to claim 1;
a first heat exchanger;
a second heat exchanger; and
a refrigerator,
wherein an outlet of said compressor in said air refrigerant cooling apparatus is connected to an inlet of said first heat exchanger,
an outlet of said first heat exchanger is connected to an inlet of said second heat exchanger,
an outlet of said second heat exchanger is connected to an inlet of said expansion turbine in said air refrigerant cooling apparatus,
an outlet of said expansion turbine in said air refrigerant cooling apparatus is connected to an inlet of said refrigerator,
an outlet of said refrigerator is connected to an inlet of said compressor in said air refrigerant cooling apparatus through said second heat exchanger,
a conduit connected to said outlet of said second heat exchanger is branched for cooling down an inside of said motor,
said branched conduit is connected to an air vent provided on a casing of said motor, and
said inlet of said compressor in said refrigerant cooling apparatus is connected to another air vent provided on said casing.

6. A refrigerator container comprising:
the air refrigerant cooling apparatus according to claim 1;
a first heat exchanger;
a second heat exchanger;
a container box; and
a radiator,
wherein an outlet of said compressor in said air refrigerant cooling apparatus is connected to an inlet of said first heat exchanger, an outlet of said first heat exchanger is connected to an inlet of said second heat exchanger, an outlet of said second heat exchanger is connected to an inlet of said expansion turbine in said air refrigerant cooling apparatus, an outlet of said expansion turbine in said air refrigerant cooling apparatus is connected to an inlet of said container box, an outlet of said container box is connected to an inlet of said compressor in said air refrigerant cooling apparatus through said second heat exchanger, said radiator is provided outside said air refrigerant cooling apparatus for cooling down an inside of said motor in said air refrigerant cooling apparatus, and an inlet and an outlet of said radiator are connected to air vents which are provided on a casing of said motor and associated with respective of said inlet and said outlet of said radiator, and said air refrigerant cooling apparatus, said first heat exchanger, said second heat exchanger, said container box, and said radiator are configured to be transportable.

7. An air refrigeration system comprising:
the air refrigerant cooling apparatus according to claim 2;
a first heat exchanger;
a second heat exchanger;
a refrigerator;
a filter; and
a fan,
wherein an outlet of said compressor in said air refrigerant cooling apparatus is connected to an inlet of said first heat exchanger, an outlet of said first heat exchanger is connected to an inlet of said second heat exchanger, an outlet of said second heat exchanger is connected to an inlet of said expansion turbine in said air refrigerant cooling apparatus, an outlet of said expansion turbine in said air refrigerant cooling apparatus is connected to an inlet of said refrigerator, an outlet of said refrigerator is connected to an inlet of said compressor in said air refrigerant cooling apparatus through said second heat exchanger, and said fan supplies fluid into a casing of said motor through said filter.

8. An air refrigeration system comprising:
the air refrigerant cooling apparatus according to claim 2;
a first heat exchanger;
a second heat exchanger;
a refrigerator; and
a radiator,
wherein an outlet of said compressor in said air refrigerant cooling apparatus is connected to an inlet of said first heat exchanger, an outlet of said first heat exchanger is connected to an inlet of said second heat exchanger, an outlet of said second heat exchanger is connected to an inlet of said expansion turbine in said air refrigerant cooling apparatus, an outlet of said expansion turbine in said air refrigerant cooling apparatus is connected to an inlet of said refrigerator, an outlet of said refrigerator is connected to an inlet of said compressor in said air refrigerant cooling apparatus through said second heat exchanger, said radiator is provided outside said air refrigerant cooling apparatus, and an inlet and an outlet of said radiator are connected to air vents which are provided on a casing of said motor and associated with respective of said inlet and said outlet of said radiator.

9. An air refrigeration system comprising:
the air refrigerant cooling apparatus according to claim 2;
a first heat exchanger;
a second heat exchanger; and
a refrigerator,
wherein an outlet of said compressor in said air refrigerant cooling apparatus is connected to an inlet of said first heat exchanger, an outlet of said first heat exchanger is connected to an inlet of said second heat exchanger, an outlet of said second heat exchanger is connected to an inlet of said expansion turbine in said air refrigerant cooling apparatus, an outlet of said expansion turbine in said air refrigerant cooling apparatus is connected to an inlet of said refrigerator, an outlet of said refrigerator is connected to an inlet of said compressor in said air refrigerant cooling apparatus through said second heat exchanger, a conduit connected to said outlet of said second heat exchanger is branched for cooling down an inside of said motor, said branched conduit is connected to an air vent provided on a casing of said motor, and said inlet of said compressor in said refrigerant cooling apparatus is connected to another air vent provided on said casing.

10. A refrigerator container comprising:
the air refrigerant cooling apparatus according to claim 2;
a first heat exchanger;
a second heat exchanger;
a container box; and
a radiator,
wherein an outlet of said compressor in said air refrigerant cooling apparatus is connected to an inlet of said first heat exchanger, an outlet of said first heat exchanger is connected to an inlet of said second heat exchanger, an outlet of said second heat exchanger is connected to an inlet of said expansion turbine in said air refrigerant cooling apparatus, an outlet of said expansion turbine in said air refrigerant cooling apparatus is connected to an inlet of said container box, an outlet of said container box is connected to an inlet of said compressor in said air refrigerant cooling apparatus through said second heat exchanger, said radiator is provided outside said air refrigerant cooling apparatus for cooling down an inside of said motor in said air refrigerant cooling apparatus, and an inlet and an outlet of said radiator are connected to air vents which are provided on a casing of said motor and associated with respective of said inlet and said outlet of said radiator, and said air refrigerant cooling apparatus, said first heat exchanger, said second heat exchanger, said container box, and said radiator are configured to be transportable.

11. An air refrigerant cooling apparatus comprising:
a motor having a first magnetic bearing and a second magnetic bearing for supporting a shaft;
a compressor;
an expansion turbine; and a means for generating pressure differences between spaces where said first magnetic bearing and said second magnetic bearing are provided and respective of an inlet of said compressor and an outlet of said expansion turbine, wherein said compressor is connected to said shaft and separated from said first magnetic bearing by a first labyrinth, and said expansion turbine is connected to said shaft and separated from said second magnetic bearing by a second labyrinth.

12. The air refrigerant cooling apparatus according to claim 11, further comprising:

sensors for detecting a position of said shaft, said sensors provided adjacent to said first magnetic bearing and said second magnetic bearing; and a means for generating a pressure difference between a space where said sensors are provided and an outside of a casing of said motor.

13. An air refrigeration system comprising:

a first bearing for supporting a shaft;

a compressing mechanism;

an expansion turbine;

a first heat exchanger;

a second heat exchanger; and a first conduit, wherein an outlet of said compressing mechanism is connected to an inlet of said first heat exchanger, an outlet of said first heat exchanger is connected to an inlet of said second heat exchanger, an outlet of said second heat exchanger is connected to an inlet of said expansion turbine, an outlet of said expansion turbine is connected to an inlet of a refrigerator, an outlet of said refrigerator is connected to an inlet of said compressing mechanism through said second heat exchanger, a compressor in said compressing mechanism is connected to said shaft and is separated from said first bearing by a first labyrinth, said expansion turbine is connected to said shaft, and said first conduit supplies an air refrigerant from between an outlet of said compressor and said inlet of said refrigerator to a space where said first bearing is provided.

14. The air refrigeration system according to claim 13, further comprising:

a second bearing supporting said shaft at a position closer to said expansion turbine than said compressor; and a second conduit for supplying said air refrigerant from said space where said first bearing is provided to a space where said second bearing is provided.

15. The air refrigeration system according to claim 14, further comprising a third conduit for supplying said air refrigerant from said space where said second bearing is provided to said outlet of said expansion turbine.

16. The air refrigeration system according to claim 13, further comprising a motor for rotating said shaft, wherein said first bearing and said second bearing are magnetic bearings.

17. The air refrigeration system according to claim 13, wherein said first conduit is configured to derive said air refrigerant from said inlet of said expansion turbine.

18. The air refrigeration system according to claim 13, said compressing mechanism further includes an auxiliary compressor provided upstream of said compressor.

19. A refrigerator container comprising the air refrigeration system according to claim 13; and a container box connected to said outlet of said expansion turbine.

20. The air refrigeration system according to claim 14, further comprising a motor for rotating said shaft, wherein said first bearing and said second bearing are magnetic bearings.

21. The air refrigeration system according to claim 11, further comprising a motor for rotating said shaft, wherein said first bearing and said second bearing are magnetic bearings.

* * * * *